V. H. VAN SANT.
AIR INLET DEVICE.
APPLICATION FILED SEPT. 23, 1919.
1,342,193.
Patented June 1, 1920.
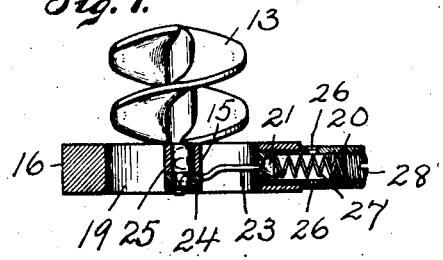
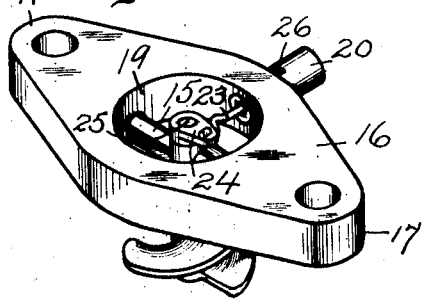
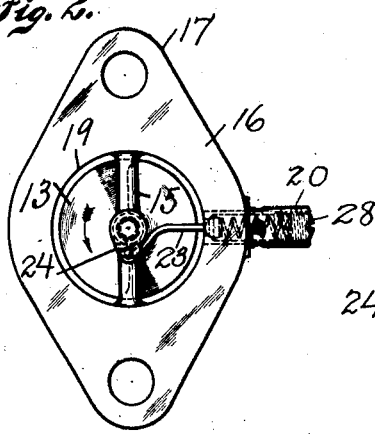
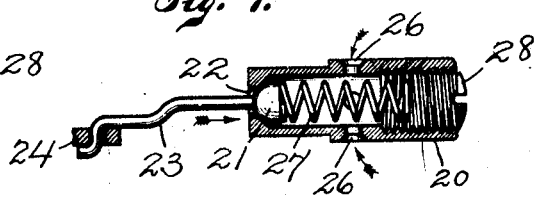
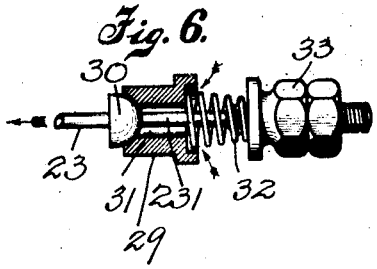
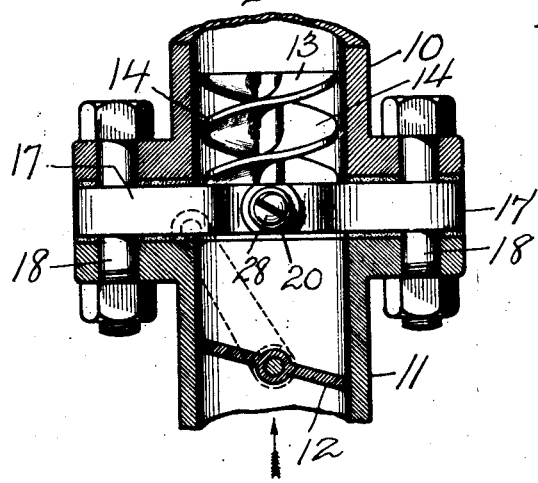
INVENTOR
Victor H. Van Sant.
BY
Wm H Canfield
HIS ATTORNEY

UNITED STATES PATENT OFFICE.

VICTOR H. VAN SANT, OF NEWARK, NEW JERSEY.

AIR-INLET DEVICE.

1,342,193.  Specification of Letters Patent.  Patented June 1, 1920.

Application filed September 23, 1919. Serial No. 325,688.

*To all whom it may concern:*

Be it known that I, VICTOR H. VAN SANT, a citizen of the United States, and a resident of Newark, county of Essex, and State of New Jersey, have invented certain new and useful Improvements in Air-Inlet Devices, of which the following is a specification.

This invention relates to an improved device for controlling the admission of air through the sides of a pipe to increase the amount of air in such pipe, said pipes being actuated and controlled by the velocity of the fluid passing through the pipe.

In order to make the description of this invention clear, it is described as applied to the intake mechanism of an internal combustion engine, as this is the location for which it was primarily designed, but it is, of course, applicable to other situations where it can be used to advantage. The description herein being directed toward its use in conjunction with an internal combustion engine, it will be described as applied preferably at a point between the intake manifold of the engine and the outlet of the carbureter, where the air and the gasolene that have been mixed are passing to the engine.

It is well known that as the speed of the engine increases, the suction also increases, but the flow of gasolene and the flow of air do not increase in the same proportion, as the flow of gasolene from the jet of the carbureter increases under increased suction faster than the flow of air, and in this way as the velocity increases the mixture grows richer, which, of course, causes a waste of fuel.

My invention is designed to provide a device which is actuated by the velocity of the fluid passing through the pipe or conductor, which device admits air when the velocity is arriving at a predetermined speed, and as the speed increases beyond this point air is admitted to the mixture in increasing quantities to overcome the suction on the jet of the carbureter and to also feed to the engine the proper proportions of air and gasolene.

The invention is designed to provide a device of this kind which acts as above and which is adjustable so as to regulate the amount of additional air to be fed through the air inlet valve of the device at a given velocity of the mixture in the main pipe.

The invention is further designed to provide a device of this kind that also acts as a mixer to more intimately associate the gasolene and the air, which, of course, conduces to better combustion and more engine efficiency.

The invention can be placed in the manifold of an engine, can be made as part of the carbureter or it can be made as a separate element to be inserted between any carbureter and any form of manifold, this latter form being illustrated in the drawing to make the construction of the invention clear.

In said drawing, Figure 1 is a section of the device with the mixer shown in elevation. Fig. 2 is a bottom view of the device shown in Fig. 1. Fig. 3 is a perspective view of the device turned upside down to clearly illustrate the construction underneath. Fig. 4 is a detail section of the inlet air valve. Fig. 5 is a section of the end of the intake manifold and of the outlet of the carbureter with the device shown in elevation, and Fig. 6 is a detail view showing a modified form of inlet air valve.

In the drawing, 10 indicates the tube, and for the purpose of a clear understanding I will call it the intake manifold. 11 is the outlet pipe of the carbureter, 10 and 11 together forming a pipe or pipe-like conductor, the pipe 11 being shown equipped with the usual butter-fly valve 12, which controls the amount of mixture passing through the pipe. In the pipe I place an element which is mounted so that it can be rotated by the fluid passing through the pipe, this element 13 having the amount of movement controlled by the velocity of the fluid, and it can be of any suitable form to permit such actuation, the form shown comprising a device that is helical, having the vanes 14, usually two, made of a suitable pitch so that there is no material checking of the fluid through the pipe, but acting to swirl the mixture so that it is more thoroughly mixed.

This movable element or mixer is suitably supported, in the form shown this being done by providing a spider or bar 15 in the casing 16, which casing can be made of substantially flat form and adapted to fit between the elements 10 and 11, having the projecting parts 17 which receive the bolts 18, which bolts also hold the parts 10 and 11 together, and having the interior passage or channel 19 which is substantially in register with the interior of the intake manifold and the outlet of the carbureter.

An air valve is installed to admit air to the inside of the pipe, in the form shown this air valve comprising a valve casing 20, into which the valve 21 is placed to control the passage of air through the air valve. To bring about such control the valve 21 is illustrated as being seated on the outlet port 22 of the valve casing 20. The valve stem 23 is connected to the valve and is operated from the mixer. In the type illustrated, the crank 24 is connected to the stem 25 of the mixer and the end of the valve stem is connected to the crank so that when the crank is moved, the valve 21 is moved. The air valve has suitable inlet ports such as 26.

A yielding means is installed for normally holding the movable element or mixer against motion so as to insure its not being moved when the velocity of the fuel in the pipe is low, and the spring 27 embodies one means for so yieldingly holding the device in normal inoperative position, said spring 27 abutting on the back of the valve 21, and a screw 28 is placed on the end of the valve casing to form an abutment for the other end of the spring 27, and also permits a regulation of the tension of the spring.

It will be evident from this description that fluid passing in a slow velocity through the intake pipe of the engine will not operate the mixer 13, but when the velocity of the fluid passes beyond a certain point it is sufficient to rotate the mixer against the influence of the spring 27, and when this point is reached, the connection between the mixer and the valve causes the valve to be pushed open, this opening increasing as the velocity increases, so that air can pass through the inlet valve into the conductor or pipe 10, thus acting to maintain the proper ratio of the flow of gasolene to the flow of air.

In Fig. 6 I show a modified form of inlet valve, in this form the inlet valve casing 29 having a valve 30 which is pulled instead of pushed to open it, the valve stem 23 extending beyond the valve. This valve has a single port 31 extending through it and has a spring 32 on the outside which bears on the adjusting nut 33 and against the valve casing to yieldingly hold the valve stem and its valve against opening below a predetermined velocity of mixture passing through the main pipe or conductor.

It will be evident that minor changes can be made in the construction and location of the parts without departing from the scope of the invention, and I do not wish to be limited to the particular form of device shown.

I claim:

1. A device of the class described comprising a pipe for conducting fluid, an element in the pipe, said element being rotatable by fluid passing through the pipe, and means for yieldingly holding the element against rotation, said means including a valve to admit air to the pipe.

2. A device of the class described comprising a pipe for conducting fluid, an element in the pipe, said element being rotatable by fluid passing through the pipe, an air inlet valve connected to the element, and yielding means for holding the element against rotation.

3. A device of the kind described comprising a pipe, a mixer in the pipe and secured so that it can be rotated by fluid passing through the pipe, an inlet valve to admit air into the pipe, a spring to hold the valve shut, and a connection between the valve and the mixer whereby the rotation of the mixer is limited and the mixer actuates the valve against the influence of the spring.

4. A device of the kind described comprising a pipe-like conductor for a fluid, a pivoted mixer mounted so as to be moved on its pivot by the fluid passing through the conductor, a crank on the pivot, a valve casing with inlet and outlet ports, a valve to control the passage through the ports, and a valve stem connecting the valve and the crank.

5. A device of the kind described comprising a pipe-like conductor for a fluid, a pivoted mixer mounted so as to be moved on its pivot by the fluid passing through the conductor, a crank on the pivot, a valve casing with inlet and outlet ports, a valve to control the passage through the ports, a valve stem connecting the valve and the crank, and a spring to normally hold the valve in closed position.

6. A device of the kind described comprising a casing, a helical mixer centrally and rotatably supported in the casing, a crank connected to the mixer, a valve casing having an outlet port opening into the main casing, a valve in said outlet port of the valve casing, a valve stem on the valve and connected to the crank, and a spring in the valve casing to yieldingly hold the valve shut.

7. A device of the kind described comprising a casing, a helical mixer centrally and rotatably supported in the casing, a crank connected to the mixer, a valve casing having an outlet port opening into the main casing, a valve in said outlet port of the valve casing, a valve stem on the valve and connected to the crank, a spring in the valve casing to yieldingly hold the valve shut, and a screw in the end of the valve casing, said spring abutting on the screw.

In testimony that I claim the foregoing I have hereto set my hand this 28th day of August, 1919.

VICTOR H. VAN SANT.